THOMAS H. SAVERY.

Improvement in Expanding Pulley.

No. 4,685, Reissued Dec. 26, 1871.

*Witnesses:—*
W. H. Rowe,
Joel Leyton.

Thomas H. Savery
by his Atty
Wm. D. Baldwin

THE NORRIS PETERS CO., PHOTO-LITHO., WASHINGTON, D. C.

UNITED STATES PATENT OFFICE.

THOMAS H. SAVERY, OF WILMINGTON, DELAWARE.

IMPROVEMENT IN EXPANDING PULLEYS.

Specification forming part of Letters Patent No. 78,763, dated June 9, 1868; reissue No. 4,685, dated December 26, 1871.

*To all whom it may concern:*

Be it known that I, THOMAS H. SAVERY, of Wilmington, in the county of New Castle and State of Delaware, have invented a new and useful Changeable-Speed Pulley, of which the following is a specification:

My invention relates to that class of machinery, driven by belts and pulleys, in which the speed requires to be varied from time to time; and its object is to effect this variation by varying the diameter of the pulley, thus varying the angular velocity of the rim of the pulley; to which ends my improvements consist, first, in constructing a pulley with adjustable sections, co-operating in such manner as to vary the diameter of the pulley; second, in combining a rotating shaft with a sectional pulley of variable diameter; third, in combining an adjustable sectional pulley with mechanism for adjusting the sections by hand when the pulley is at rest; fourth, in combining a rotating shaft with the adjustable sections by adjusting mechanism operated by the shaft to adjust the pulley while in motion; fifth, in combining radially-adjustable pulley-sections with a scroll-wheel or its equivalent to adjust and hold the sections; sixth, in combining adjustable pulley-sections with a hand-wheel by means of a train of gearing carried by the pulley; seventh, in combining a rotating shaft a hand-wheel turning freely on the shaft, a gear-wheel carried by the hand-wheel, and mechanism carried by the pulley for adjusting the sections; eighth, in combining a radially-slotted face-plate carried by a shaft, and pulley-sections having arms movable endwise in the slots of the face-plate, but prevented from turning therein, thus insuring the accuracy of the position of the pulley-sections under all adjustments.

Figure 1:
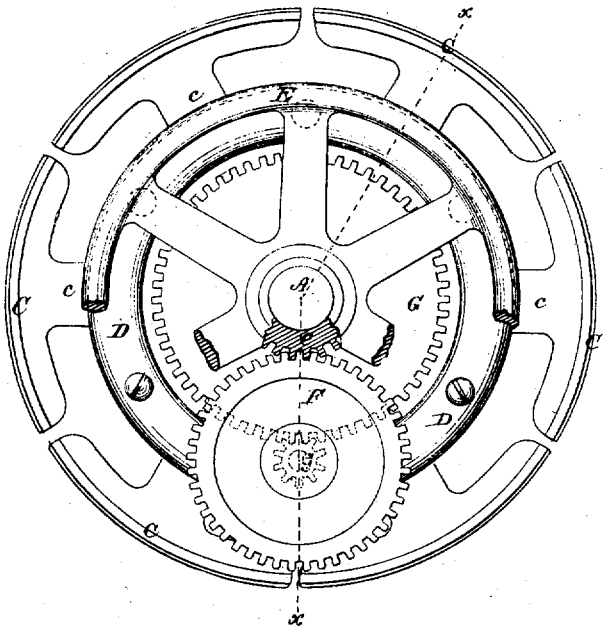
Figure 2:
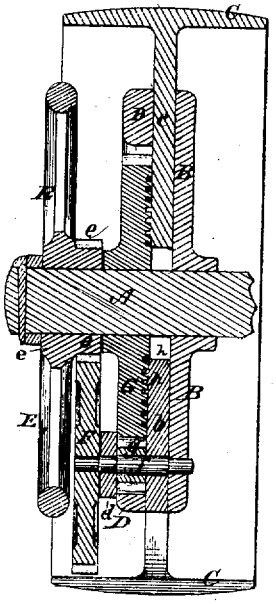
Figure 3:
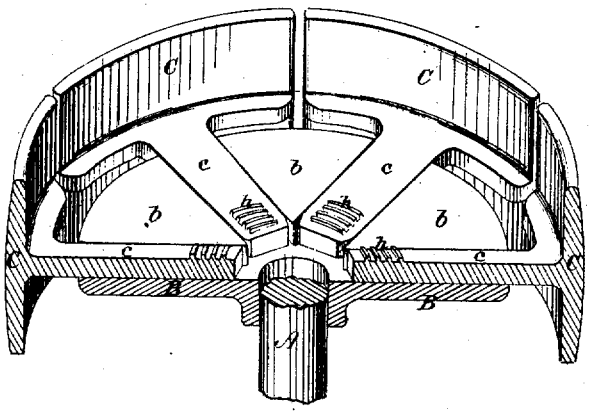
Figure 4:
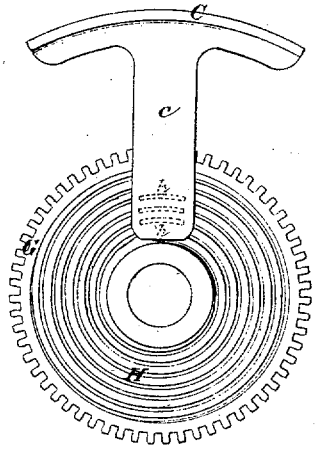

In the accompanying drawing, Figure 1 represents a view of one side of the pulley and its appurtenant mechanism illustrating my invention. Fig. 2 represents a transverse central section thereof through the line *x x* of Fig. 1. Fig. 3 represents a sectional perspective view of a part of the pulley. Fig. 4 represents a view of one of the adjustable pulley-sections and its adjusting mechanism.

In this instance a rotating shaft A, mounted in suitable bearings, carries a face-plate, B, having sector-blocks *b* secured on one face thereof, at intervals, so as to leave radial slots or grooves between them. These slots, if preferred, may be planed in the face of the plate B instead of having the section-blocks secured thereto. The arms *c* of the pulley-sections C fit snugly, but slide freely endwise in these slots, being held therein by a ring, D, secured to the face-plate or sector-blocks. A hand-wheel, E, capable of turning freely on the shaft A, carries a pinion, *e*, which may either form a part of the hand-wheel or be secured thereto. In this instance this pinion drives a gear-wheel, F, fixed on an arbor, *f*, mounted at one end in the face-plate B, and at the other in a bearing-block, *d*, secured to the ring D, and carrying a pinion, *g*, which meshes with a spur-wheel or scroll-disk, G, revolving freely on its bearings. A scroll, H, on the face of this spur-wheel, engages with teeth *h* on the arms *c* of the pulley-sections, and thus serves to move them toward or from the shaft.

I have thus described a simple and effective device by which the adjustment of the pulley-sections may be effected; but it is obvious that the mechanism for attaining this object might be modified in various ways well known to mechanics without departing from the spirit of my invention. Friction-wheels, for instance, might be substituted for toothed gear-wheels with good results; or the hand-wheel might by connected directly with the adjusting mechanism instead of using a train of intermediate gearing, which merely reduces the speed and the power required to adjust the pulley-sections. When the pulley is at rest its sections may be adjusted by turning the hand-wheel and thus actuating the scroll-wheel. When, however, the pulley is in motion this adjustment is effected simply by accelerating or arresting the rotation of the hand-wheel, which ordinarily revolves with the shaft and pulley. When the rotation of the hand-wheel is thus accelerated or arrested the pulley-sections are expanded or contracted, according to the direction in which they are running, by the action of the scroll H on their teeth. The train of gearing shown is very efficient in adjusting a rapidly-rotating pulley, as but little power is required with this mechanism, and its operation is gradual, so that nice adjustments of speed can be attained.

I claim as my invention—

1. An adjustable sectional pulley, substantially as hereinbefore set forth.

2. The combination of a rotating shaft and an adjustable sectional pulley, substantially as hereinbefore set forth.

3. The combination of a sectional pulley with mechanism for varying its diameter when the pulley is at rest, substantially as hereinbefore set forth.

4. The combination of a rotating shaft, a sectional pulley, and mechanism for adjusting the diameter of the pulley while in motion, substantially as hereinbefore set forth.

5. The combination of the radially-adjustable pulley-sections and the scroll-wheel, or their equivalents, substantially as hereinbefore set forth.

6. The combination of the hand-wheel and adjustable pulley-sections by connecting mechanism, substantially as hereinbefore set forth.

7. The combination of the rotating shaft, the hand-wheel turning freely thereon, the gear-wheel carried by the hand-wheel, the adjusting mechanism revolving with the shaft, and the adjustable sections—these members operating in combination, substantially as hereinbefore set forth.

8. The combination of the shaft, the radially slotted face-plate, and the pulley-sections having arms movable endwise in the slots, substantially as hereinbefore set forth.

THOS. H. SAVERY.

Witnesses:
SAM. C. BIDDLE,
EDWARD SAVERY.

(87)